United States Patent Office 3,749,626
Patented July 31, 1973

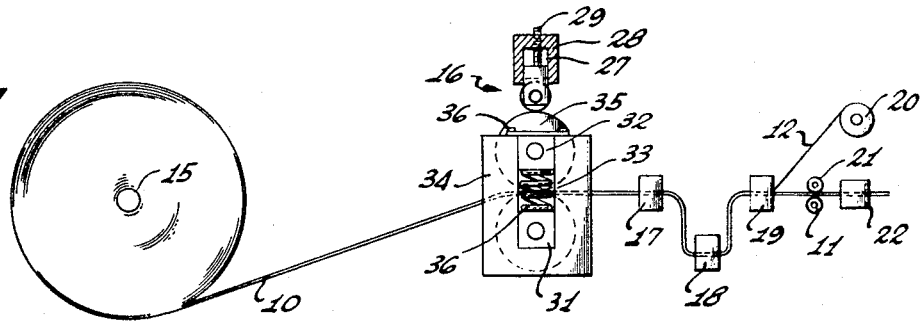
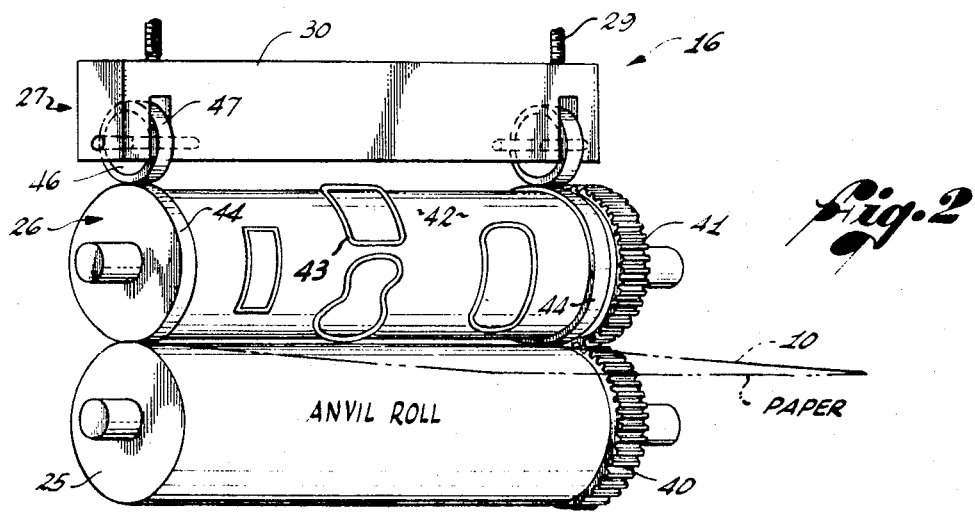
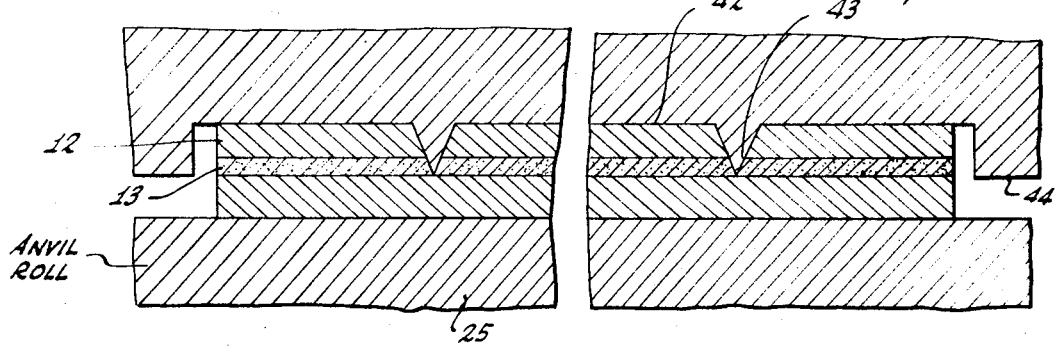

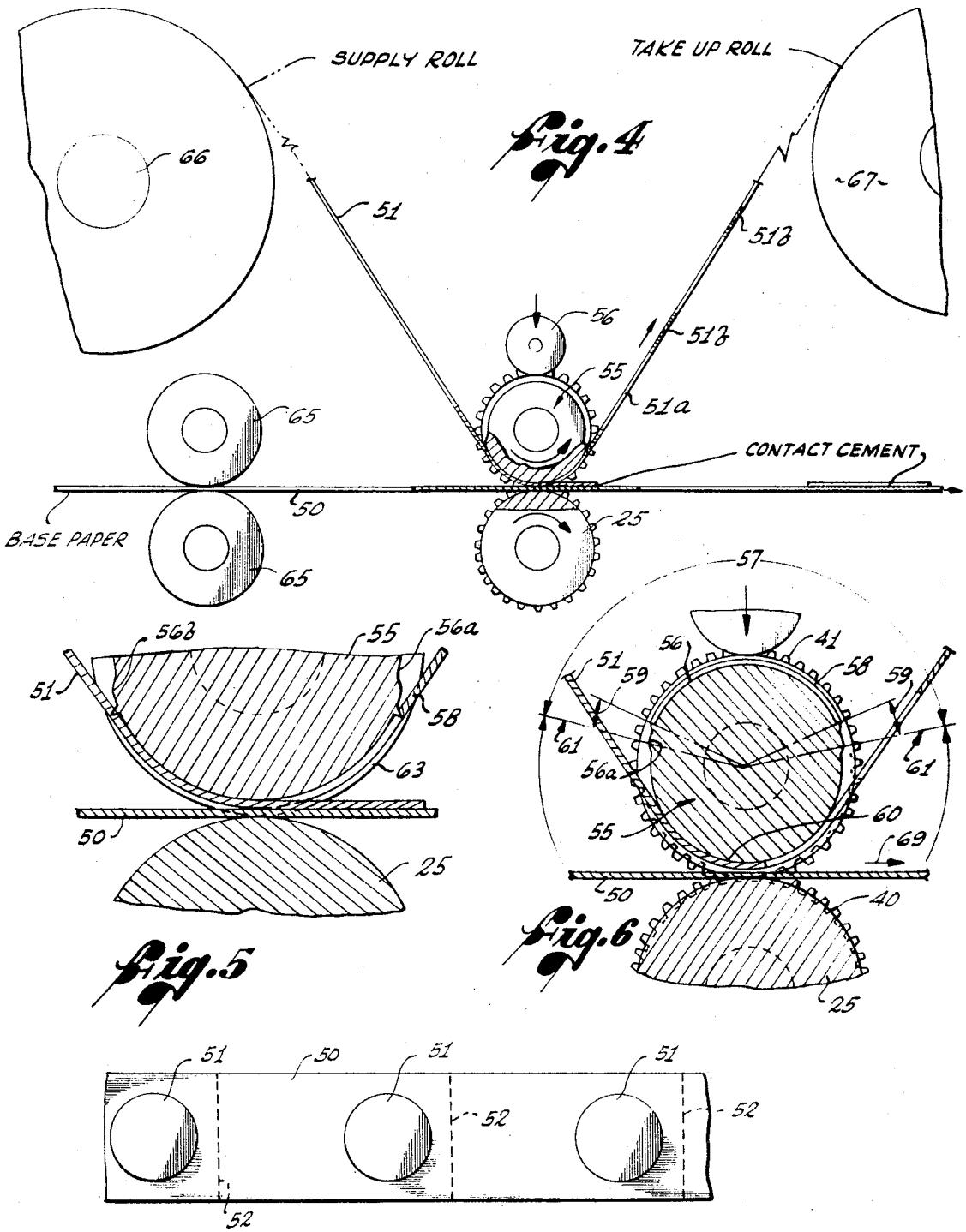

3,749,626
ROTARY DIE APPARATUS AND PROCESS FOR MANUFACTURING LABELS OR THE LIKE
Homer G. Buck, 803 S. Rimpau Ave., Los Angeles, Calif. 90005
Filed June 28, 1971, Ser. No. 157,108
Int. Cl. B32b 31/00
U.S. Cl. 156—251    6 Claims

ABSTRACT OF THE DISCLOSURE

In a label making machine, at a die cutting station, the cutting edge of a rotary die is maintained in precisely spaced relationship to an opposing anvil roll by the essentially incompressible nature of a web of the backing paper and label paper nipped between these two rotary elements, whereby the cutting edge pierces only the label paper and adhesive layer of the composite sheet structure, without piercing the backing sheet.

---

When the work to be processed comprises a composite tape, e.g., a layer of pressure sensitive adhesive backed label paper joined to a release-coated surface of a backing paper, the die cutting station is employed as a primary pinch roll for drawing the composite tape from a supply reel thereof in advance of label printing, drying, stripping and delivery stations of the label making machine, whereby accuracy of registration of the die cut labels in the stations downstream of the die cutting station is maintained.

Where webs of a backing stock and a top stock are to be joined from separate supply reels thereof into a composite structure at different feed rates, the die cutting edge is on a lobe of the rotary die. The balance of the surface of the die is relieved, i.e., of reduced radius relative to the lobe, whereby the cutting edge of the lobe portion die cuts the top stock and feeds it onto the backing stock at the same rate as a constant feed rate of the latter. The feed roll and stripping roll for the top stock are substantially balanced with regard to drag and tension, respectively, whereby the travel of the top stock is arrested during that phase of rotation of the die during which the relieved portion thereof passes in opposition to the anvil roll.

BACKGROUND OF THE INVENTION

The present invention relates to the manufacture of composite sheet material structures that are adhesively joined together and has its primary utility in the making of pressure sensitive adhesive backed labels on a paper sheet backing.

As employed herein, a "composite sheet structure" is a base sheet to which another sheet is laminated by an intermediate layer of adhesive, the other or top sheet being ultimately die cut, e.g., to a desired planform which is sometimes of substantially lesser area than that portion of the base sheet with which it is associated. For example, the base sheet may be of a paper having a release coating on one side that carries a paper label having a side covered with a pressure sensitive adhesive holding the label to the release coated side of the base stock. Another example of composite sheet structure is a base stock of two layers of a synthetic plastic flexible sheet material with heat sealed seams to define a bag, when inflated. This double sheet base, when flat or deflated and fed as a web, has a die cut paper or plastic sheet adhesively applied to one ply thereof, for example, as a ring surrounding a hole in that ply of the bag.

For label making, the composite sheet structure is commercially available in supply rolls thereof, the web of which is run through label printing and drying stations, then a die cutting station, a waste stripping station (to take-up that portion of the label paper that has been cut out by the die), through pinch rolls and, finally, to a station where the completed product is delivered as sheets, or fan-folded, or coiled on a roll. Machines for carrying out this process are old and well known in the art. In these machines the pinch rolls are highly polished and pull the web through all the prior stations with a force, e.g., 35 pounds, and against a static or brake loading, e.g., 25 pounds, on the supply reel of the composite stock. As a result of this stress, the web of the stock is elongated in passing through the work stations and, due to variations in the density of the stock, it is variably elongated, leading to problems in maintaining registration of the labels in the printing stations.

In other instances, the base stock and top stock are mounted on the machine in separate supply rolls and it is desired to adhere a die cut piece of the top sheet web onto a larger area of the base sheet web of stock. In the present machines, the two different kinds of stock are fed at the same rate and, as a relatively small area of the top sheet is left in the final composite sheet structure product, much of the top sheet stock is stripped off as waste in the stripping station. For example, in a colostomy bag wherein the base stock is two layers of plastic sheet with sheet sealed seams having an area of, say, 40 sq. in., a circular paper or plastic and double-coated adhesive ring is secured to one ply around a hole into the bag and may be formed from about 3 sq. in of the top stock. In order to attain high production rates it is necessary to make articles of this type in present day rotary die machines whereby the top stock is fed continuously at the same rate as the base stock so that much of the top stock is wasted.

Finally, the currently available machines employ die cutting stations wherein pressure rollers bear on opposite end bearing roll portions of a rotary die that in turn bear on ends of an anvil roll. The bearing ends of the rotary die and anvil must be precisely circularly ground to insure that the cutting edge of the die penetrates the top stock and adhesive only, without cutting the base stock. Heretofore, the depth of cut and uniformity of the depth of cut by the rotary die has been a function of the forceful direct rolling engagement of the roll bearing ends of the die against the anvil and the roundness of these rollingly engaged parts. Accordingly, these parts have had to be manufactured with extreme precision and the die has had to be made of solid stock. Due to the wearing of its cutting edges the die had to be frequently remachined to maintain the correct radial space between its cutting edge and the diameter of its end bearer rolls to maintain the required depth of cutting action.

SUMMARY

In the present invention, the die cutting station comprises an anvil roll, a rotary die, and a means for biasing the rotary die toward the anvil roll with a force that is substantially uniformly applied axially of the die. The die and anvil are drivingly coupled for synchronous rotation, as by gear means, but are otherwise maintained out of contact by the composite sheet structure being worked therebetween. Thus, the rotary die is mounted in floating bearings, i.e., floating in the sense that the bearing supports for the rotary die need not be in any predetermined fixed spatial relationship relative to the rotary axis of the anvil roll. The rotary die has a body portion of uniform diameter from end to end which is preferably, although not necessarily, precisely circular. In other words, the body portion need not be precisely circular but may operate successfully with a generous out-of-roundness tolerance. While the rotary die may be made of a tubular material it is preferably made of a solid material. In any event, the body portion of the rotary die is formed, as by the process of electro-erosive machining, with a cutting edge projecting radially outwardly from the surface of the body a radial distance equal to the combined thickness of the top stock and the layer of adhesive material thereon. While not essential, it is desirable to form opposite ends of the rotary die with protective flanges of a diameter greater than the diameter included by the cutting edge of the die in order to prevent damage to the cutting edge in the event of accidental or inadvertent contact between the rotary die and anvil roll.

With the foregoing arrangement, the die is biased against the composite sheet structure which, in turn, is biased against the anvil roll. Thus, the spacing between the cutting edge of the die and the unyielding anvil is maintained by the mass of the web material nipped in the plane including the rotary axes of the die and anvil. Accordingly, the cutting edge severs the top stock and adhesive only, leaving the base stock intact.

In making labels or the like from a reel of stock comprising a release coated base sheet web having a pressure sensitive adhesive label sheet web thereon, the die cutting apparatus of this invention is employed as a primary pinch roll for drawing the stock from the supply reel thereof. Thus, the die cutting apparatus is positioned immediately adjacent the supply reel of stock and in advance of the other stations of the machinery such as, for example, the printing, drying and stripping stations, and secondary pinch rolls at the exit end of the machine. With this arrangement, the static load or braking force on the supply reel may be reduced, say to the order of 10 pounds, or into substantial equilibrium with a tensile force, e.g. 10 pounds, at the die cutting station, while the secondary pinch rolls may have a low pulling force, say on the order of 2 pounds. With this arrangement, elongation of the web of the composite stock material as it proceeds through the several stations, i.e. die cutting, printing, drying and stripping is very greatly reduced with the result that registration of the labels is very easily maintained throughout the several stations of the apparatus despite wide ranges of variability of the density of the stock.

In applications where the base stock and top stock are mounted on separate, independent supply reels, the die cutting station of this invention is modified to allow a continuous feed of the base stock concurrently with stop and go feeding of the top stock. In this embodiment of the invention, the rotary die member is formed with a lobe portion comprising the die cutting area of the die, i.e., an arcuate sector containing the cutting edge with the cutting edge protruding radially beyond the lobe sector a distance equivalent to the combined thickness of the top stock and the adhesive thereon. The balance of the surface of the die member is relieved to an arcuate sector of a radius relative to the diameter of the lobe surface, sufficient to provide a clearance between the top stock and the base stock during that phase of revolution of the die member when the relieved sector passes in opposition to the anvil. The die sector of the die member, during its phase of revolution past the anvil, operates in conjunction with the anvil to accomplish the die cutting in the same manner as the first described embodiment of the invention. As a result, the top stock is fed and die cut during the phase of revolution of the die sector against the anvil roll. When the relieved sector of the die member passes in opposition to the anvil roll the feed of the top stock is arrested. In this connection, a substantial balance between a brake force on the supply roll of the top stock and a pulling force on the waste take-up roll for the top stock arrests movement of the top stock during passage of the relieved sector of the die pass the anvil roll. As a result, the only waste of the top stock in its longitudinal dimension is a relatively slight area thereof separating apertures in the waste strip portion of the top stock.

DESCRIPTION OF THE DRAWINGS

FIG. 1 is a schematic, side elevational view of apparatus embodying the invention;

FIG. 2 is a perspective view of the die cutting apparatus of this invention;

FIG. 3 is a sectional view, on an enlarged scale, through a plane including the axes of the rotary die and anvil roll;

FIG. 4 is a schematic side elevational view of the invention as particularly adapted for sequential feeding of a top stock from a supply reel independent of a supply source of the base stock;

FIG. 5 is a sectional view, on an enlarged scale, of the anvil roll and rotary die portions of the apparatus of FIG. 4 during the cutting phase of the rotary die portion;

FIG. 6 is a cross-sectional view similar to FIG. 5 but illustrating the relative position of the parts in that phase of rotation of the rotary die during which feed of the top stock is arrested; and FIG. 7 is a top or partial top plan view of a composite sheet structure resulting from utilization of the apparatus of FIG. 4.

DESCRIPTION OF THE PREFERRED EMBODIMENTS

FIG. 1 illustrates a label making apparatus adapted for carrying out the invention. In this case, the apparatus is set up for continuously making a series of discrete, pressure sensitive adhesive backed labels out of a composite web 10. Thus, referring to FIG. 3, the composite structure has a web of backing paper 11 having a release coating on one side, i.e., the top side as illustrated in the drawing. A web of label paper 12 is provided on its bottom side with a layer 13 of pressure sensitive adhesive secured to the release coated side of the backing paper 11. A wide variety of such composite tapes 10 are commercially available, e.g., the Fast Speed product known as S277FS, and it is a common characteristic of such tapes that are not readily compressible between an opposed pair of rollers.

In the conventional setup of rotary label making apparatus the web of the composite tape 10 is first passed through a printing station, then through a drying station, then a die-cutting station, then through a stripping station (in which the waste portion of the label paper is stripped from the tape), then through a pair of pinch rolls, and, finally, through an exit station at which the completed label product is delivered either in a roll, or in a fan-fold arrangement, or as a series of discrete labels. In such arrangements it is, further, common for the web stock to be passed through a plurality of printing and drying stations. It is necessary to load the supply reel of the tape 10 with a relatively high static brake load, on the order of 25 pounds, while the pinch rolls are adapted to pull on the tape with a force on the order of 35 pounds. Accordingly, the tape 10 is highly stressed as it passes through the work stations intermediate the supply reel and the pinch rolls. The resulting tensile stress on the tape 10, intermediate the supply roll thereof and the pinch rolls, results in elongation of the label paper and backing paper stock and, due to the variations in density of the stock of these papers, it is frequently difficult to maintain the labels in registration as they pass from work station to work station. Obviously, in those cases where the lack of registration is extreme long runs of labels may be entirely wasted.

The rotary die apparatus of this invention permits a rearrangement of the order of the work stations which radically reduces the tensile stress on the web of the tape 10 and, accordingly, maximizes the maintenance of registration of the labels as they pass through the various work stations. Such an arrangement is shown in FIG. 1 wherein a supply reel of the composite tape 10 is mounted on a spindle 15 that is adjusted to exert a static brake load of on the order of 10 pounds. The tape 10 is then trained through a rotary die apparatus 16, i.e., the die cutting station at which the desired planform of label is cut into the layer of label paper 12.

Subsequently, the tape 10 is passed through one or more printing and drying stations 17 and 18, respectively, and then into a stripping station 19. At this latter station, the waste area of the label paper 12 is stripped off into a take-up reel 20, while the backing paper 11, with the discrete labels thereon, passes through an opposed pair of pinch rolls 21 for delivery to a final station 22 at which the several labels are processed into the desired form for delivery, e.g., onto a reel.

In this arrangement the rotary die apparatus 16 not only performs the function of die cutting the label paper 12 and the underlying adhesive but, also, serves as a primary pinch roll exerting a tensile or pulling force around the order of 10 pounds, i.e., a force substantially equal to the brake force on the supply spindle 15. The pair of pinch rolls 21 are adjusted to exert a pulling force of on the order of 2 pounds. As a result, the composite tape 10 is minimally stressed in passing through the several stations intermediate the die cutting station 16 and the pinch rolls 21 whereby the maintenance of registration of the labels in passage through the printing, drying and stripping stations is very greatly improved.

The rotary die apparatus 16 comprises an anvil roll 25, a rotary die 26 and a die pressure means 27. It will, of course, be understood that all of the elements shown in FIG. 1 are typically mounted on a common machine frame. Thus, the machine frame may be provided with a forwardly protruding rigid beam 28 having a pair of tapped holes at opposite ends to receive a pair of hold down screws 29 adapted to bear against the upper face of a pressure bar 30, the bar being guided at opposite ends in a pair of vertically extending slots formed in appropriate brackets fixed to the machine frame. The anvil roll 25 and rotary die 26 are mounted at opposite ends in pairs of bearing blocks 31 and 32 that are mounted in vertically extending slots 33 of a pair of frame members 34 that are rigidly secured to the machine frame. The pair of bearing blocks 31 for the anvil roll 25 are bottomed in the slots 32 and, thus, are in relatively fixed relationship to the machine frame. However, the pair of bearing blocks 32 which support the rotary die 26 are vertically slidable with respect to the slots 33 but are retained within the slots by means of crossbars 35 straddling the upper ends of the slots 33, these crossbars being secured in place by appropriate fasteners 36. While not essential, spring means 36 may be employed within the slots 33 for biasing apart an adjoining pair of bearing blocks 31 and 32.

The anvil roll 25 typically takes the form of a hardened steel cylinder that has been ground to a uniform diameter from end to end in its body portion. At one end, the anvil roll 25 is provided with a spur gear 40 adapted for driving engagement with a spur gear 41 provided on the corresponding end of the rotary die 26. It will, of course, be understood that the gears 40 and 41 have the same pitch diameter and the same diametral pitch.

The rotary die 26 has a cylindrical body portion 42 that is integrally formed with radially outwardly protruding cutting edges 43. As in indicated in FIG. 3, the cutting edges 43 protrude radially beyond the surface of the body portion 42 a radial distance corresponding to the combined thickness of the web of the label paper 12 and the layer of adhesive 13. While the body portion 42 may be of uniform diameter from end to end, it is preferred to form its opposite ends with a pair of protective circumferential flanges 44 concentric with the body portion but of a radius exceeding the radius of the cutting edges 43. With this arrangement, when the tape 10 is not present between the anvil roll 25 and rotary die 26 and in the event of failure of the springs 36, the flanges 44 prevent the cutting edges 43 of the die from coming into engagement with the anvil roll 25, so preventing inadvertent damage to the cutting edges.

Preferably, the rotary die 26 is made out of a solid steel cylinder that is electro-erosively machined to the desired planform configuration of cutting edges 43. It will, of course, be understood that the cutting edges 43 illustrated in FIG. 2 are merely by way of illustration, both as to the number thereof and the particular shapes thereof. Alternatively, the rotary die 26 may be made out of a tubular metallic material which is also electroerosively machined to achieve the desired planform configuration or configurations of cutting edge 43 and the degree of radial protrusion of such cutting edges beyond the body portion 42 of the die.

In order to hold the body portion 42 and cutting edges 43 of the rotary die against the web of a composite stock 10 and against the anvil roll 25, the bar 30 at opposite ends, is provided with a pair of rollers 46 having polyurethane rims 47 that bear against the pair of flanges 44 of the rotary die. Thus, the screws 29 are adjusted, as by means of a torque wrench, to equally bear against the bar 30 whereby to force both rollers 46 into rolling engagement with the flanges 44 of the rotary die. As a result, when the web of a composite tape 10 is nipped between the rotary die 26 and the anvil roll 25, substantially uniform pressure is brought to bear on the web transversely thereof.

The rotary die 26 is self-adjusting with respect to the unyielding anvil roll 25 by virtue of the substantially incompressible nature of the stock of the composite tape 10. The cutting edges 43 can penetrate only through the combined thickness of the label paper 12 and the adhesive 13 and the clearance of the cuting edges 43 relative to the anvil 25 is in no way dependent upon a rolling engagement between directly bearing portions of the rotary die and anvil roll. As a consequence, considerable out-of-roundness of the body portion 42 of the rotary die and of the cutting edges 43 thereon can be tolerated. Irrespective of any out-of-roundness, the cutting edges 43 will at all times penetrate precisely through the combined thickness of the label paper 12 and adhesive layer 13, without peneration of the base stock 11.

If the rotary die 26 be made of a tubular material, rather than out of solid stock, the means for holding or biasing the die against the composite stock 10 and against the anvil roll 25 may take the form of a solid metal cylinder that is coated from end to end with a sleeve of a resilient material, such as polyurethane. In such an arrangement, the cutting edges 43 would, of course, depress the polyurethane sleeve of the solid pressure roller and the solidity of the pressure roller would in turn uniformly stress the tubular rotary die throughout its axial length.

In FIG. 4 there is schematically illustrated an embodiment of this invention particularly adapted for making a composite sheet structure out of separate supply rolls of a web of a base sheet 50 and a web of an adhesive coated top sheet 51. In the illustrated embodiment, the base sheet 50 is assumed to be a paper stock which is release coated on its upper side. However, the base stock could equally well consist of two plies of a synthetic plastic sheet material formed with heat sealed seams along its longitudinal edges and transverse seams spaced longitudinally of the web material as, for example, in making a colostomy bag. The illustrated top stock 51 is assumed to be paper stock having a pressure sensitive adhesive coating on the underside. However, the top stock could equally well be a double release coated web of material which is desired to die cut into areas which are relatively small as compared to the corresponding area of base stock to which the top stock is to be adhered. In other words, it is to be understood that the representation of the apparatus shown in FIG. 4 is not to be taken in any limiting sense but is only illustrative of an arrangement such as is shown in FIG. 7 wherein the completed product comprises relatively long areas of a base stock 50 onto which die cut relatively small areas of the top stock 51 have been deposited, the completed product being defined by the transverse boundary lines 52. In order to minimize waste of the top stock 51, the apparatus employs a modified form of the rotary die assembly previously described.

In this embodiment of the invention, the rotary die apparatus comprises an anvil roll 25, a rotary die 55 and a pressure means 56. As in the previous embodiment of the invention, these three rotary elements are mounted to the machine framework with their axes of rotation located in a common vertical plane. The anvil roll 25, as before, has a rotary axis which is fixed relative to the machine framework while the rotary die 55 has a rotary axis which is, in effect, self-adjusting with respect to the anvil roll, within limits to be described. The pressure means 56 may conveniently take the form of the pressure means 27 shown in FIG. 2. As before, the anvil roll 25 and rotary die 55 are formed with machined spur gears 40 and 41, respectively, in order to be continuously synchronously driven.

The die 55 is formed with a die lobe 56 which, as illustrated in FIG. 6, comprises an arcuate sector of the cylindrical stock out of which the die is made, the arc included by this sector being indicated at 57. The die lobe 56 is formed with a cutting edge 58 which protrudes radially beyond the die lobe surface a distance equivalent to the combined thickness of the top stock 51 and the adhesive layer carried thereby. In this case, it is assumed that the cutting edge 58 is an arcuate development of the flat circular die cut areas 51 illustrated in FIG. 7. As is illustrated in FIG. 6, the arcuate extent of the cutting edge 58 is less than that of the arc 57 included by the lobe 56. Thus, the trailing and leading edges of the cutting edge 58 are offset from corresponding ends of the lobe 56 by amounts indicated by the arcs 59.

The balance of the peripheral surface of the die 55 is a relieved portion 60 whose arcuate extent is indicated in FIG. 6 by the arc 61. The relieved portion 60 is of a uniform radius that is preferably less than the radius of the die lobe 56 by an increment of about the thickness of the top stock 51 and the adhesive layer thereon.

The die 55 is formed at opposite ends with circular flange portions 63 whose radius is less than the sum of the radius of the cutting edge 58 plus the thickness of the top stock 51 and the adhesive carried thereon. In other words, the portions 63 need not have firm rolling contact with the periphery of the anvil roll 25 during that phase of rotation of the die 55 in which the die lobe 56 passes in opposition to the anvil roll 25. As a result, the relative incompressibility of the stock 50 and 51 between the die lobe 56 and the anvil roll 25 determines the clearance therebetween. On the other hand during that phase of rotation of the die 55 when the relieved portion 60 turns in opposition to the anvil roll 25, the roll bearing portion 63 may, but need not necessarily, engage the periphery of the anvil roll 25. In any event, the difference in radii of the die lobe surface 56 and the relieved portion 60 is calculated with reference to the thickness of the top stock 51 and the adhesive thereon and the diameter of the flanges 63 such that during this phase of rotation the top stock 51 is spaced apart from the base stock 50.

Referring to FIG. 4, a supply reel (not shown) of the base stock 50 has its web trained through an opposed pair of guide rollers 65 between the anvil roll 25 and die member 55. While not shown, it will be understood that the supply reel of the base stock 50 has a braking load imposed thereon and, beyond the anvil roll 25 and die member 55, is subjected to the pull of an opposed pair of pinch rolls.

The top stock 51 is supplied in reel form mounted on a spindle 66 that is subjected to a brake force of approximately 5 pounds. The web of the top stock 51 is trained between the anvil roll 25 and the die member 55 and then, after being die cut, is taken up by a take-up reel 67 that is adjusted to exert a pulling force of on the order of 5 pounds. In this connection, it will of course be appreciated that the static brake forces applied to the supply reels of the base stock 50 and the top stock 51 and the pulling forces applied thereto will be primarily determined by the material of which the top and base stock are made. However, substantial equilibrium between the brake force and pulling force for the top stock 51 is desired in order to effect proper stop-and-go feeding of the top stock in response to the operation of the die member 55.

In operation, the web of the base stock 50 is continuously fed at a constant rate through the die apparatus. As stated, this constant feed of the base stock 50 is a function of the pinch rolls (now shown) and the lineal speed of the base stock is synchronized with the peripheral speed of the anvil roll 25.

Accordingly, assuming the relative angular positions of the anvil 25 and die member 55 as illustrated in FIG. 6, the base stock 50 is advancing in the direction of the arrow 69 while at the same time the top stock 51 is immobile. At the same time, the die member 55 is rotating at the same angular velocity as the anvil roll 25 with the clearance portion 60 thereof sliding relative to the immobile top stock 51, the top stock being immobilized due to the equilibrium of the static and pulling forces on the supply reel and take-up roll, respectively.

Referring to FIG. 6, it will be seen that when a leading edge 56a of the die lobe 56 intercepts the common plane of the axes of the members 25 and 55, that portion of the web of the top stock 51 within that plane deflected radially outwardly, due to the increase in radius of the die lobe 56 relative to the relieved portion 60. As a result, the base stock 50 and top stock 51 are nipped between the rotary members 25 and 55 and the top stock 51 is accelerated to the same velocity as the velocity of the base stock 50. Upon continued rotation of the two rotary members 25 and 55, as represented in FIG. 5, the cutting edge 58 of the die lobe severs the desired planform out of the top stock 51. In that phase of rotation of the die members 55 shown in FIG. 5, the mode of operation of the two opposed rotary members is the same as described with reference to the relationship of the members 25 and 26 in connection with FIG. 2.

When a trailing edge 56b of the die lobe 56 passes beyond its intersection with the common plane including the axes of the rotary members 25 and 55 a distance equal to the arc 59, the surface of the relieved portion 60 of the member 55 once again comes into play and, as a result, the top stock 51 is radially displaced inwardly relative to the axis of the member 55 to the immobile condition represented in FIG. 6. As is shown in FIG. 4, the waste portion of the top stock 51 is left with openings 51a spaced apart longitudinally of the waste strip by integral portions 51b and this waste strip is taken up by the stop and go movement of the take-up roll 67. As will now be apparent, the dimensions of the portions 51b, longitudinally of the waste strip, is equal to the sum of the two arcs 59 illustrated in FIG. 6. Obviously, as contrasted to the prior practice of continuously feeding the top stock, the present invention greatly minimizes wastage of the top stock with respect to the lengthwise area thereof.

While presenty preferred embodiments of the invention have been illustrated and describd, it will be obvious to those skilled in the art that various changes and modifications may be made therein without departing from the invention.

I claim:

1. In a machine for die cutting to a predetermined depth the web of a composite sheet structure comprising a backing sheet and an adhesive backed top sheet;
    a rotary anvil having a hard unyielding cylindrical surface adapted for continuous rolling engagement with the backing sheet of the web;
    a body having a hard die surface of arcuate form comprising a portion, at least, of the periphery of said body, said surface having a constant radius;
    said die surface being formed with a cutting edge on a radius exceeding the radius of said die surface by an amount substantially equivalent to the combined thickness of the top sheet and the adhesive;

mounting means synchronously coupling said anvil and said body for co-rotation about parallel axes, with said anvil in unyielding relationship relative to said body;

and means to apply a force distributed substantially uniformly axially of said body to cause said body to bear against the top sheet of the web to press the web against said anvil, whereby the material of the web in the plane including the axes of said body and said anvil maintains a clearance of said cutting edge relative to the surface of the anvil that is substantially equivalent to the thickness of the backing sheet while said cutting edge severs the top sheet and adhesive in passing through said plane.

2. A machine as in claim 1 in which:

said die surface of said body defines a complete cylinder of an axial length exceeding the width of the web, said body being formed at opposite ends with a pair of concentric circular portions of a radius exceeding the radius of said cutting edge and less than a radius equal to the sum of the radius of said die surface of said body and the thickness of the composite sheet structure.

3. A machine as in claim 1 in which said means to apply a force to said body includes a biasing means.

4. A machine as in claim 1 in which:

said cutting edge is an arcuate development of a predetermined flat planfrom and is formed on said die surface within an arcuate sector that is smaller than the arcuate sector of said body included by said die surface, said die surface comprising a lobe of said body of greater radius than the balance of the periphery of said body, said body being formed at opposite ends with a pair of concentric circular portions of a radius exceeding the radius of said cutting edge and less than a radius equal to the sum of the radius of said die surface of said body and the thickness of the composite sheet structure.

5. A machine as in claim 2 in which the machine includes printing and drying stations, said anvil and rotary body being positioned in advance of said printing and drying stations to die cut the top sheet of the web in advance of the printing and drying stations;

said machine having means operatively associated with said anvil and said rotary body to pull the web of said composite sheet structure thereinto with a force that is substantially equal to a braking force applied to the web in advance of said anvil and said rotary body.

6. A machine as in claim 4 having separate supply reels for supporting independent and separate reels of the top sheet and of the backing sheet, said machine also having a take-up roll means for receiving the waste strip of the top sheet;

said supply reel for said top sheet including a means to impose a braking force on the top sheet that is substantially equal to a pulling force exerted on the waste strip by said take-up roll means.

References Cited
UNITED STATES PATENTS

| | | | |
|---|---|---|---|
| 3,124,498 | 3/1964 | Ziegler | 156–510 |
| 3,331,726 | 7/1967 | McGinley et al. | 156—510 |
| 3,235,430 | 2/1966 | Wilkins | 156—510 |
| 3,447,987 | 6/1969 | Williams | 156—353 |
| 3,489,628 | 1/1970 | Catzen | 156—353 |

J. TRAVIS BROWN, Primary Examiner

E. C. KIMLIN, Assistant Examiner

U.S. Cl. X.R.

156—353, 375, 510